United States Patent [19]
Timmermans

[11] 3,742,378

[45] June 26, 1973

[54] DEVICE FOR PRODUCING STIMULATED INFRARED EMISSION, AN IRASER, BY MEANS OF AN ELECTRIC DISCHARGE IN A GAS MIXTURE WHICH CONSISTS PARTLY OF CARBON DIOXIDE, AND DISCHARGE TUBE FOR SUCH A DEVICE

[75] Inventor: Abraham Timmermans, Emmasingel, Eindhoven, Netherlands

[73] Assignee: U.S. Philips Corporation, New York, N.Y.

[22] Filed: Nov. 3, 1971

[21] Appl. No.: 195,328

[30] Foreign Application Priority Data
Nov. 7, 1970 Netherlands.................. 7016333

[52] U.S. Cl.................. 331/94.5, 313/174, 315/108
[51] Int. Cl............................................... H01s 3/22
[58] Field of Search................................. 331/94.5; 313/174–181; 315/108

[56] References Cited
UNITED STATES PATENTS
1,529,597  3/1925  Langmuir...................... 313/180 X
2,317,265  4/1943  Foerste et al................... 313/174 X
3,641,455  2/1972  Matovich.......................... 331/94.5

OTHER PUBLICATIONS

Witteman, IEEE J. Quantum Electronics, Vol. QE-4, No. 11, Nov. 1968, pp. 786–788.

Lapidus et al., The J. of Physical Chemistry, Vol. 68, No. 7, July 1964 pp. 1863–1865.

*Primary Examiner*—Ronald L. Wibert
*Assistant Examiner*—R. J. Webster
*Attorney*—Frank R. Trifari

[57] ABSTRACT

The invention relates to a device for producing stimulated infrared emission, an iraser, by means of an electric discharge in a gas mixture which mainly consists of carbon dioxide, nitrogen, helium and water vapour and in which the gas mixture is in contact with a quantity of zeolite which is partly saturated with water. The invention furthermore relates to an electric discharge tube for such a device.

5 Claims, 1 Drawing Figure

Patented June 26, 1973  3,742,378
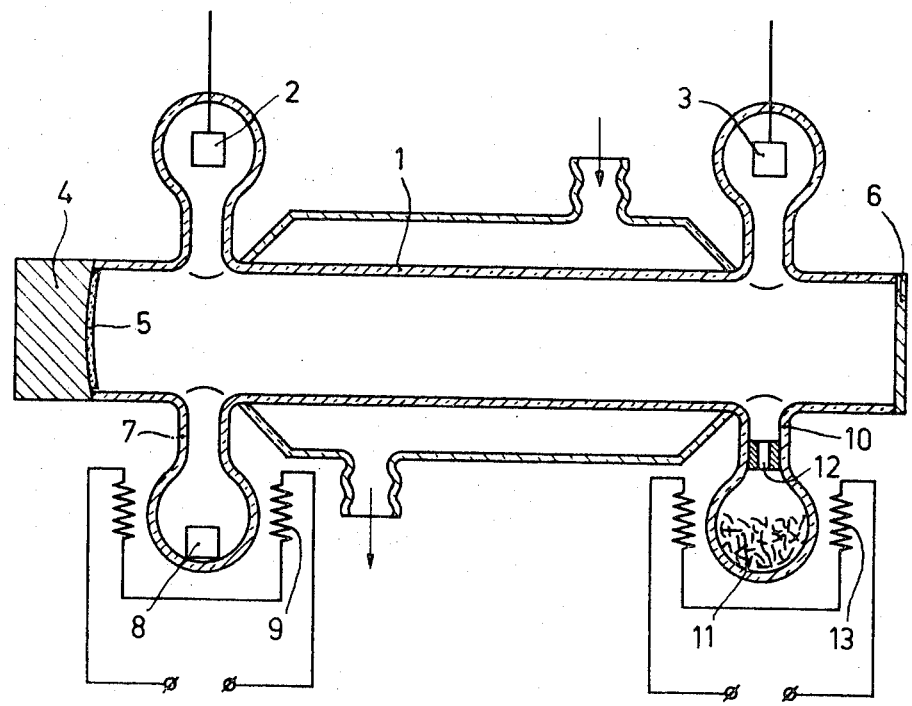
INVENTOR.
ABRAHAM TIMMERMANS
BY
AGENT

DEVICE FOR PRODUCING STIMULATED INFRARED EMISSION, AN IRASER, BY MEANS OF AN ELECTRIC DISCHARGE IN A GAS MIXTURE WHICH CONSISTS PARTLY OF CARBON DIOXIDE, AND DISCHARGE TUBE FOR SUCH A DEVICE

The invention relates to a device for producing stimulated infrared emission, an iraser, by means of an electric discharge in a gas mixture which mainly consists of carbon dioxide, nitrogen, helium and water vapour and in which the gas mixture is in contact with a quantity of zeolite which is partly saturated with water. The invention furthermore relates to an electric discharge tube for such a device.

The water in the zeolite serves to keep the water vapour pressure at a value of approximately 0.1 – 0.3 Torr. If this should not be done, the technically useful life of the discharge tube would soon come to an end by the dissociation of the carbon dioxide. Actually, the water vapour must produce the regeneration of the dissociated carbon dioxide. Too high a water vapour pressure is also unfavourable for the iraser action.

The zeolite is described in the Dutch patent application 6802135. Initially, said material comprises one to a few hundred times the quantity of water which is present in vapour form in the discharge tube. It has been found, however, that the zeolite does not always give up the water in a reliable manner when the pressure of the water vapour becomes too low. This results in a decrease in the useful life of the tube.

It is the object of the invention to provide an improvement by which any unreliable action of the zeolite results in fewer difficulties, while in addition other advantages are obtained.

According to the invention, a device is provided for producing stimulated infrared emission, an iraser. This is accomplished by means of an electric discharge in a gas mixture which mainly consists of carbon dioxide, nitrogen, helium and water vapour and in which the gas mixture is in contact with a quantity of zeolite which is partly saturated with water. The discharge space of the tube communicates with another space in which an organic material is present. The vapour of the material has a pressure of approximately in the range of $10^{-4}$ to $10^{-1}$ Torr at room temperature. The material decomposes under the influence of the discharge into carbon dioxide and/or carbon monoxide and water. In a special form of the invention the material has such a composition that nitrogen is also liberated during the decomposition.

The gases liberated by the decomposition may form a compensation for the disappearance of the gases originally present in or at the electrodes or in or at the wall of the discharge space. In view of the desirable pressure of the water vapour, the quantity of water formed will often be proportionally too large relative to that of the other gases. The excess of water, however, can easily be absorbed by the zeolite which is partly saturated with water.

The communication between the space which contains the decomposing material and the discharge space preferably consists of a narrow aperture in a partition, one or more capillaries, or a sieve between the two spaces. The sieve prevents particles of the material from reaching the discharge space proper.

Of the materials which are suitable for use in a device according to the invention, and which decompose into carbon dioxide and/or carbon monoxide and water, oxalic acid is the most suitable although nitroglycerin may also be used if so desired. The materials which also supply nitrogen are: urea nitrate, glucol dinitrate, nitroglycerin and oxamic acid.

It is to be noted that it is known from Dutch patent application 6903718 to provide in a discharge tube for an iraser which comprises carbon dioxide, helium and nitrogen, a source of carbon dioxide so as to maintain the pressure of said gas at the correct value. For this purpose are mentioned, inter alia, lead carbonate, silver carbonate, copper carbonate, iron carbonate and barium carbonate. However, these materials are not suitable for use in a gas mixture which also contains water vapour because the carbonates can react with the water.

In order that the invention may be readily carried into effect, it wll now be described in greater detail, by way of example, with reference to the accompanying drawing, the sole FIGURE of which shows a discharge tube according to the invention.

Reference numeral 1 in the FIGURE denotes a quartz tube, 1.5 m long, inner diameter 10 mm. The hollow cylindrical platinum electrodes 2 and 3 are arranged in side tubes. The tube 1 is closed on the left-hand side with a concave turned aluminium block 4 covered with a layer of gold 5. The radius of curvature is 2.5 m. The right-hand side of the tube is closed by a plane parallel plate 6 of germanium, 2 mm thick. The gas filling of the tube 1 consists of 1.5 Torr $CO_2$, 8 Torr He and 0.2 Torr $H_2O$. The tube is operated with a direct current of 30 mA at an operating voltage of 14 kV. The produced iraser power of 40 W at a wavelength of approximately 10.6 $\mu$.

A quantity of zeolite 8, weight approximately 150 mg, which is partly saturated with water, is present in the side tube 7. For activating during evacuation of the tube and prior to the absorption of the water, heating of the zeolite is necessary for which purpose the heating coil 9 is provided.

Approximately 500 mg of oxalic acid 11 is present in the side tube 10. The communication of the oxalic acid vapour with the discharge tube 1 is effected through a capillary of 0.3 mm in the partition 12. For the heating, if any, of the oxalic acid, the heating coil 13 may be used. Dependent upon the circumstances, cooling of the side tubes 7 and 10 may be carried out by means of a current of air or a flow of water.

What is claimed is:

1. In a device for producing stimulated infrared emission by means of an electric discharge in a gas mixture which mainly comprises carbon dioxide, nitrogen, helium, and water vapor, and in which said gas mixture is in contact with a quantity of zeolite which is partly saturated with water, the subcombination comprising:
    a discharge tube having a hollow portion;
    a first means defining a storage space supported by said discharge tube and communicating with said hollow portion, said first means containing said watered zeolite;
    a second means defining a storage space supported by said discharge tube and communicating with said hollow portion, said second means containing a material for providing a vapor for said discharge tube which decomposes under the influence of a discharge into nitrogen and one of the following groups:

Carbon dioxide and carbon monoxide; carbon dioxide; and carbon monoxide and discharge means supported by said discharge tube and communicating with the hollow portion of said tube, said discharge means providing said electrical discharge to produce said infrared emission, and also having the purpose of decomposing said vapor into nitrogen, and one of the following groups: carbon dioxide and carbon monoxide; carbon dioxide; and carbon monoxide.

2. A device as claimed in claim 1, further comprising a cooling jacket substantially surrounding said discharge tube.

3. A device as claimed in claim 1, wherein said first means further comprises heating means for heating said zeolite.

4. A device as claimed in claim 1, wherein said second means further comprises heating means for heating said vapor-producing material.

5. A device as claimed in claim 1, wherein the vapor-producing material is selected from a group of materials consisting of: urea nitrate, glycol dinitrate, nitroglycerin and oxamic acid.

* * * * *